3,009,914
MELAMINE PROCESS

Johnstone S. Mackay, Pittsburgh, Pa., assignor, by mesne assignments, to Pittsburgh Chemical Company, Pittsburgh, Pa., a corporation of Pennsylvania
No Drawing. Filed May 4, 1959, Ser. No. 810,570
7 Claims. (Cl. 260—249.7)

This invention relates to the preparation of melamine from urea.

Various methods have been proposed in the past for preparing melamine from urea. In one such procedure urea is contacted with silica gel at a temperature of 220 to 400° C. at atmospheric pressure (Mackay Patent 2,760,961). However, the yield of melamine in the lower end of the range is very small and in Example 6 of the Mackay patent at a temperature of 230° C. the gel contained only a little melamine after 8 hours of reaction. At 250° C. a reaction time of 7 hours was required for a 67% yield. This procedure has the disadvantage that to obtain good yields of melamine long reaction times or high temperatures are required. It has also been proposed to convert urea to melamine using a small amount of a guanidine salt as a catalyst utilizing a temperature of at least 300° C. and a pressure of at least 1000 p.s.i. This procedure has the disadvantage of requiring pressure equipment and relatively elevated temperatures.

It is an object of the present invention to obtain melamine from urea in good yields without the use of pressure equipment.

Another object is to obtain melamine from urea in good yields at relatively low temperatures.

A further object is to develop a novel system for preparing melamine from urea.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by heating urea in molten guanidine hydrochloride at 200–220° C. in the presence of silica gel. These results are surprising since heating urea and silica gel at 200° C. or 210° C. for up to 2 hours yields no melamine. Preferably, ammonium molybdate is added as a catalyst.

The general reaction procedure employed in the invention was to charge 50 grams of guanidine hydrochloride and 10 grams of 6–16 mesh silica gel into a flask equipped with a thermometer and agitator. The mixture was then heated to 200–220° C. to give a clear melt. Next, 10 grams of urea was added dropwise to the melt over a 30 to 60 minute period. Considerable foaming resulted during this addition and, hence, a slow addition was preferred. After all of the urea was added, the reaction was held at 200–220° C. for the desired time, e.g., one hour. The guanidine hydrochloride is generally used in an amount in excess of the urea.

When ammonium molybdate catalyst is employed, it can be used in an amount of 0.1 to 5% based on the weight of the urea.

The reaction can be carried out in an ammonia atmosphere but this is not essential.

It is critical to use atmospheric pressure. In runs at 200° C. and 225° C. in a closed system wherein the pressure could build up, no melamine was recovered from a reaction mixture of molten guanidine hydrochloride, urea and silica gel.

The temperature of reaction also is critical. No yields of melamine were obtained when the reaction temperature was reduced to either 160° C. or 175° C. Furthermore, no melamine was recovered when the reaction temperature was raised to 230° C.

While the reaction preferably is carried out in molten guanidine hydrochloride, there can also be employed molten guanidine nitrate. For convenience, the examples are set forth in tabular form. The guanidine salt, silica gel and urea were mixed in the manner previously set forth. In the examples where ammonium molybdate was employed, it was added to the molten guanidine hydrochloride and silica gel mixture.

The guanidine salt employed in Examples 1–13 was guanidine hydrochloride and in Examples 14–16 was guanidine nitrate.

| Example | Guanidine Salt (grams) | Urea (grams) | Silica Gel (grams) | Temp., ° C. | Time (hrs.) | Melamine Yield,[1] percent | Modifier (if any) |
|---|---|---|---|---|---|---|---|
| 1 | 68.0 | 24.0 | 24.0 | 210 | 1 | 17.6 | |
| 2 | 100.0 | 19.5 | 15.5 | 220 | 1 | 40.4 | |
| 3 | 50.0 | 10.8 | 8.0 | 220 | 1 | 33.0 | |
| 4 | 50.0 | 10.0 | 8.0 | 220 | 1 | 42.8 | ammonia atmosphere. |
| 5 | 50.0 | 10.0 | 10.0 | 210 | 1 | 32.3 | 0.02 gram $(NH_4)_2MoO_4$. |
| 6 | 50.0 | 10.0 | 10.0 | 210 | 1 | 54.5 | 0.1 gram $(NH_4)_2MoO_4$. |
| 7 | 50.0 | 10.0 | 10.0 | 205 | 1 | 36.0 | 0.2 gram $(NH_4)_2MoO_4$. |
| 8 | 50.0 | 10.0 | 10.0 | 205 | 1 | 50.0 | 0.1 gram $(NH_4)_2MoO_4$. |
| 9 | 50.0 | 7.5 | 10.0 | 210 | 0.5 | 52.3 | 0.1 gram $(NH_4)_2MoO_4$. |
| 10 | 50.0 | 7.3 | 10.0 | 210 | 1 | 48.7 | 0.1 gram $(NH_4)_2MoO_4$. |
| 11 | 50.0 | 9.2 | 10.0 | 210 | 1 | 48.2 | |
| 12 | 50.0 | 9.6 | 20.0 | 210 | 0.5 | 36.2 | |
| 13 | 150.0 | 29.6 | 30.0 | 205 | 1.5 | 27.6 | |
| 14 | 50.0 | 10.0 | 10.0 | 200 | 0.5 | 15.0 | |
| 15 | 50.0 | 10.0 | 10.0 | 205 | 3.6 | 35.0 | |
| 16 | 50.0 | 10.0 | 10.0 | 210 | 0.6 | 36.0 | |

[1] The yield of melamine is based on the reaction: $6 \text{ urea} \rightarrow 1 \text{ melamine} + 6NH_3 + 3CO_2$.

I claim:

1. The method of preparing melamine which comprises heating a molten guanidine salt selected from the group consisting of guanidine hydrochloride and guanidine nitrate with urea and silica gel at a temperature of from 200 to 220° C. at atmospheric pressure, said guanidine salt being used in an amount in excess of the urea.

2. A method according to claim 1 wherein a small amount of ammonium molybdate is present as a catalyst.

3. The method of preparing melamine which comprises heating molten guanidine hydrochloride, silica gel and urea at a temperature of from 200 to 220° C. at atmospheric pressure, said guanidine hydrochloride being used in an amount in excess of the urea.

4. A method according to claim 3 wherein a small amount of ammonium molybdate is present as a catalyst.

5. A method according to claim 4 wherein the ammonium molybdate is present in an amount of 1% of the urea by weight.

6. A method according to claim 3 wherein the reaction time is 0.5 to 2 hours.

7. A method according to claim 6 wherein the temperature is 210° C.

References Cited in the file of this patent

UNITED STATES PATENTS

| | | |
|---|---|---|
| 2,760,961 | Mackay | Aug. 28, 1956 |
| 2,845,424 | Kaess et al. | July 29, 1958 |

FOREIGN PATENTS

| | | |
|---|---|---|
| 163,422 | Austria | July 11, 1949 |
| 558,172 | Canada | June 3, 1958 |
| 1,112,418 | France | Nov. 16, 1955 |

OTHER REFERENCES

Smolka et al.: Monatshefte für Chemie, vol. 10, pages 90 to 100 (1889).